United States Patent [19]  [11] Patent Number: 4,922,093
Fardeau et al.  [45] Date of Patent: May 1, 1990

[54] METHOD AND A DEVICE FOR DETERMINING THE NUMBER OF PEOPLE PRESENT IN A DETERMINED SPACE BY PROCESSING THE GREY LEVELS OF POINTS IN AN IMAGE

[75] Inventors: Michel G. J. Fardeau, Les Milles; Yves F. C. Guern, Pourriéres; Jean P. Dignac, Velaux; Jean M. Drevon, Venelles, all of France

[73] Assignee: Bertin & Cie, Cedex, France

[21] Appl. No.: 331,664

[22] PCT Filed: Jun. 3, 1988

[86] PCT No.: PCT/FR88/00282
§ 371 Date: Feb. 2, 1989
§ 102(e) Date: Feb. 2, 1989

[87] PCT Pub. No.: WO88/09978
PCT Pub. Date: Dec. 15, 1988

[30] Foreign Application Priority Data
Jun. 5, 1987 [FR] France ................... 87 07922

[51] Int. Cl.⁵ .......... G01V 9/04; G06M 7/00; G06K 9/74
[52] U.S. Cl. .................... 250/221; 382/32
[58] Field of Search ........... 250/221, 222.1, 222.2, 250/578, 223 B; 382/32, 54

[56] References Cited
U.S. PATENT DOCUMENTS
3,851,096 11/1974 Collins et al. ............ 178/6.8
4,045,816 8/1977 Cave ...................... 250/578
4,258,351 3/1981 Shigeta et al. ........... 340/38 P
4,771,333 9/1988 Michaels ................. 250/578

FOREIGN PATENT DOCUMENTS
2146152 4/1985 United Kingdom .
2158324 11/1985 United Kingdom .
2180642 4/1987 United Kingdom .

Primary Examiner—David C. Nelms
Assistant Examiner—William Oen
Attorney, Agent, or Firm—Bell, Seltzer, Park & Gibson

[57] ABSTRACT

The invention relates to a method and to a device for determining the number of people to be found in a determined space, by means of a strip (14) of photodetectors (16) on which an objective lens (10) forms a linear image of a space including objects or people (12). The signals successively produced by the photodetectors (16) are compared by a microprocessor (22) in order to show up movement of people and to deduce the number of people present therefrom.

The invention is applicable to performing surveillance of premises and to performing automatic television audience surveys.

14 Claims, 3 Drawing Sheets

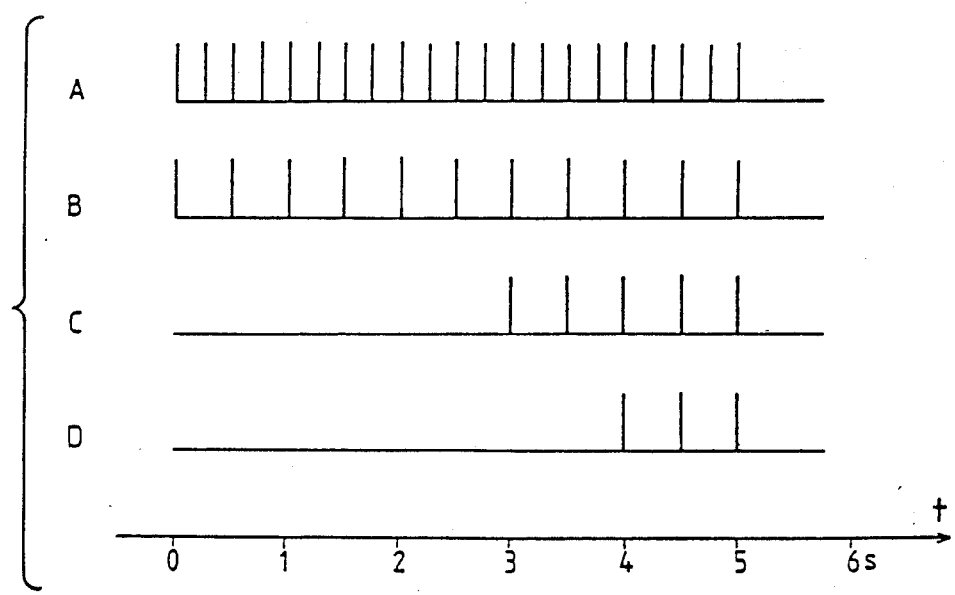

METHOD AND A DEVICE FOR DETERMINING THE NUMBER OF PEOPLE PRESENT IN A DETERMINED SPACE BY PROCESSING THE GREY LEVELS OF POINTS IN AN IMAGE

The invention relates to a method and to a device for determining the number of people present in a determined space, and it is equally applicable to performing television audience surveys and to performing automatic suveillance of premises.

Apparatuses already exist for performing television audience surveys, these apparatuses are associated with respective television sets and they are capable of recording the times at which the television set is switched on and off, together with the channel that is selected, thereby making it possible, in combination with the times given by a time base, to accurately determine which programs are selected. A central computer uses the telephone network to interrogate apparatuses of this nature associated with television sets and thus to automatically determine audience ratings and hence the success of various broadcasts put out by different television channels. However, these prior apparatuses do not provide information concerning the number of people watching a program on a television set, indeed they do not even specify whether there is anybody actually watching a television set which happens to be switched on.

Devices are also known, in general for use in premises surveillance for security purposes, which make use of ultrasonic or Doppler effect detectors and which provide information on the presence or absence or people in a determined premises. Nevertheless, these prior devices do not specify how many people are present. To obtain the number of people present it is necessary to use means for counting people passing through the entrance and through the exit of a room. However, this requires the entrance to a room to be separated from its exit, and it also requires counting to be initialized. Further, such means would not be suitable for performing automatic television audience surveys since merely verifying the presence of a person in a room where a television set is present does not ensure that the person is actually watching a broadcast.

A particular object of the present invention is to mitigate these drawbacks of known devices.

The present invention provides a method and a device for determining the number of people present in a room, and in particular the number of people watching a broadcast on a television set.

To this end, the present invention provides a method of determining the number of people present in a determined space, the method being characterized in that it consists in forming an image of said space on a strip or set of photodetectors, in reading the gray levels of the points in said image at a determined read frequency, in comparing the gray levels of the same points in successive images, in determining the variations in gray levels which are caused by the movements of a person, and in deducing the number of people present in said space therefrom.

The method of the invention thus makes it possible not only to know the number of people present in a determined space at a given moment, but also to know the variations in this number and the departures and returns of the people present. The space in question may be a premises under surveillance, or that portion of a room which faces a television set and within which people may indeed be looking at the television.

In accordance with another characteristic of the invention, the method further consists in varying the frequency at which the photodetectors are read as a function of the intensity with which the determined space is illuminated in order to obtain a mean image gray level which is substantially independent of lighting conditions.

This avoids the photodetectors saturating, and comparison between images is facilitated.

The method of the invention also consists in recording the above-specified images at a frequency which is a submultiple of the read frequency, in comparing pairs of successive images which are separated from each other by a determined number of recorded images, and in determining the variations in gray levels by taking the difference between these images.

The method also consists in varying the frequency at which images are recorded and/or the number of images separating two compared images as a function of the speed of displacement of a person.

The method thus adapts automatically to the movements of people within a room or a premises.

Finally, the method also consists in mutually comparing a variable number of successive results in order to eliminate erroneous results due, for example, to a local variation in illumination or to the temporary superposition of the images of two people.

The invention also provides a device for determining the number of people present in a determined space, characterized in that it comprises an objective lens forming an image of said space on a strip or set of photodetectors, circuits for controlling and reading the photodetectors, an analog-to-digital converter, and information processing means, such as a microprocessor, for comparing the signals successively provided by the photodetector in order to determine significant differences in said signals due to a person moving, and for deducing the number of persons present in the field of observation of the lens therefrom.

In a preferred embodiment of the invention, this device also comprises means for determining the frequency with which the photodetectors are read as a function of the intensity of illumination in said space, means for recording the signals as read and digitized, said recording taking place at a frequency which is a submultiple of the photodetector read frequency, means for comparing pairs of successively recorded signals which are separated from each other by a determined number of recorded signals and for taking the difference between the compared signals, means for transforming the differences between the compared signals into bimary signals, and filter circuits for eliminating non-significant differences.

Such a device may be associated with a television set in order to perform automatic audience surveys, or else it may be associated with a system for keeping premises under surveillance.

The invention will be better understood, and other details, chracteristics, and advantages thereof will appear on reading the following explanatory description which is made by way of example and with reference to the accompanying drawings, in which:

FIG. 3 is a diagram showing the timing of essential stages in the method of the invention.

Figure 1:
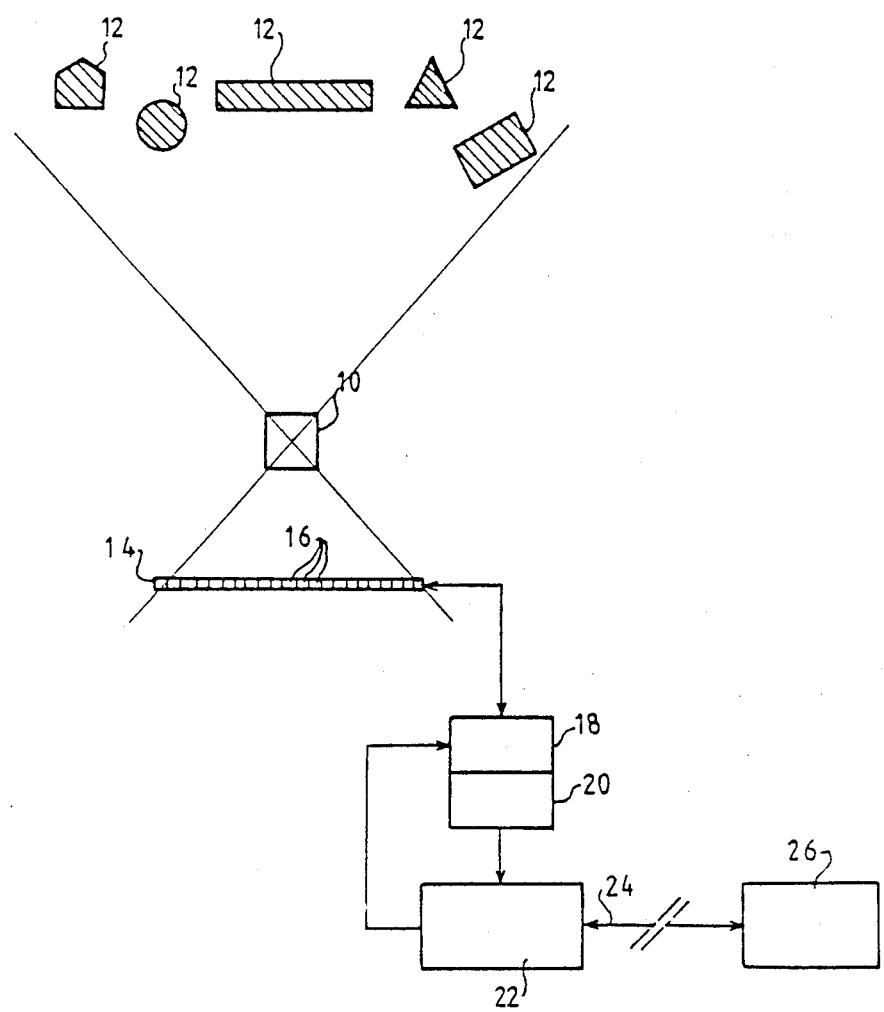
FIG. 1 is a diagram of a device in accordance with the invention.

Reference is made initially to FIG. 1 which shows the essential components of a device in accordance with the invention.

The device comprises an objective lens 10, such as the lens of a still camera or a video camera, said lens having a field of observation in which objects or persons 12 may be present.

The lens 10 is associated with a strip or row 14 of elementary photodetectors 16 such as charge-transfer photodetectors, and there may be 512 or 1,024 of them. The lens 10 forms an image of a plane in the space lying in its field of observation on the strip 14 of photodetectors 16, said plane corresponding to the plane of the drawing of FIG. 1.

The photodetectors 16 of the strip 14 are associated with circuits given an overall reference 18, including circuits for reading the charges on the photodetectors 16 and at least one clock for determining the integration period or the frequency at which the photodetectors 16 are read. The read circuits are connected via an analog-to-digital converter 20 to a microprocessor 22 which processes the output signals from the photodetectors 16 and which controls the circuits 18. The microprocessor 22 may be interrogated, for example over the telephone network 24 by a remotely situated computer or else by a central unit 26.

When the invention is applied to performing automatic audience surveys, the device of the invention is associated with a television set and is arranged to form an image on the strip 14 of photodetectors corresponding to a substantially horizontal flat zone situated at about 1 meter (m) above the ground, which height corresponds to the upper portion of the body of a person sitting in front of a television set.

When the invention is applied to performing the surveillance of premises, the device may include a matrix of photodetectors, thereby avoiding limiting its scan to a single dimension.

The main stages of the method of the invention, and the operation of the device, are now described with reference to FIGS. 2 and 3.

Figure 2:
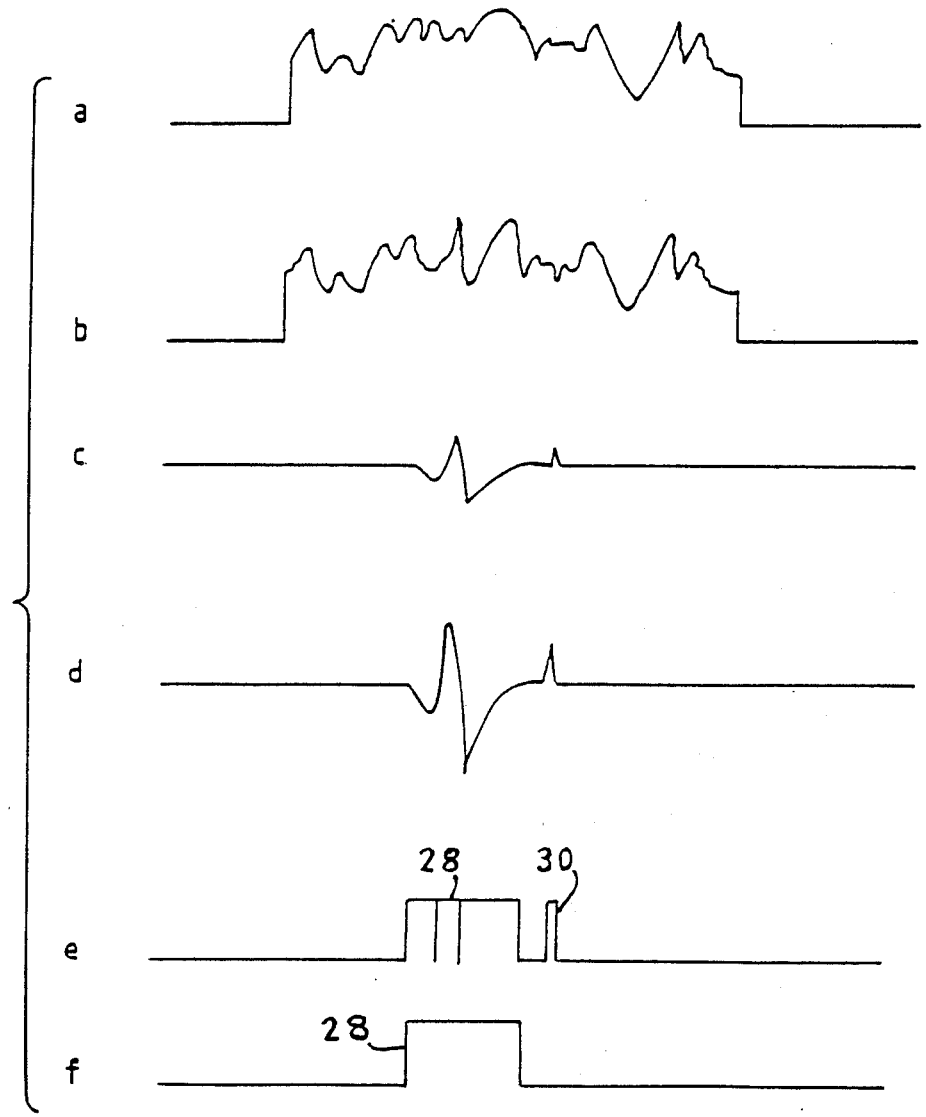
FIG. 2 is a diagram showing a method of processing the signals from the photodetector.

Curves a and b in FIG. 2 represent the video signals obtained by reading the elementary photodetectors 16 of the strip 14 at two instants which are separated by a predetermined time interval.

Each of the curves a and b represents the gray levels which are observed by the various photodetectors.

When the scene under observation does not change between two observation instants, and providing the illumination thereof has not changed either, then the curves a and b are identical. However, when a person forming a part of the scene under observation moves, even by very little, that movement gives rise to a variation in the gray levels seen by the corresponding photodetectors. Detecting variations in the gray levels seen by the photodetectors thus serves to show that a person has moved, and as a result makes it possible to recognize the presence of a person and to distinguish that person from other people forming a part of the same scene under observation. As a corollary, it is possible to determine the number of people present in the scene. It is not possible, in practice, for a person to remain completely stationary, without even breathing, for more than a few seconds.

The processing of the video signals provided by the strip 14 of photodetectors is essentially as follows: two successive signals such as those represented by curves a and b are compared, and they are subtracted from each other in order to obtain the signal shown by curve c. This signal is amplified (curve d), and is then rectified and converted into binary signals by comparison with a given threshold, which is set to eliminate the residual noise of the photodetectors 16. The gain of the amplification is adjusted as a function of the illumination observed during the preceding reads, and for each point under consideration, the threshold is a function of the illumination of said point. The resulting signal, shown in curve e, comprises a first squarewave pulse or echo 28 of relatively large width and a second squarewave pulse or echo 30 of much smaller width. This signal is then applied to a filter which retains only the first echo 28 (curve f) which corresponds to a person, while eliminating the second echo 30 whose width is much to small to correspond to a person, and which may be due, for example, to a local change in illumination (e.g. a lamp being switched on or off) or to the movement of a hand or an object held by a person.

In greater detail, the timing of the various operations of the method of the invention may be as follows (FIG. 3):

The photodetectors in the strip 14 are read at a frequency which is determined by the microprocessor 22 as a function of the intensity with which the observed scene is illuminated so as to avoid saturating the photodetectors and so as to ensure that the mean gray levels seen by the photodetectors remain substantially constant and independent of lighting conditions. In practice, the rate at which the photodetectors are read may vary over the range one to ten (or even more) reads per second. The series of reads applied to the photodetectors for a given 5 second (s) to 6 s period of time is represented by portion A of FIG. 3, from which it can be seen that reading takes place at a frequency of about four reads per second.

The signals read by the circuit 18 and digitized by the converter 20 are recorded by the microprocessor 22 at a frequency which is no greater than the read frequency and which is more often a submultiple of said read frequency. Portion B of FIG. 3 shows the stage of recording the digitized signals, and it can be seen in this example that a signal is recorded every half-second, which is equivalent to saying that only every other digitized signal is recorded.

The next stage consists in comparing pairs of successive recorded signls which are separated from each other by a predetermined time interval or by a predetermined number of recorded signals, and in taking the difference between the pair of signals being compared. This stage is represented by portion C of FIG. 3 for the case where the recorded signals being compared are separated from each other by an interval of 3 seconds. In other words, the first signal recorded at instant zero is compared 3 seconds later with the signal which has just been recorded, and the difference between them is processed as described with reference to FIG. 2 (they are amplified, rectified, transformed into binary signals, and then filtered) in order to obtain a result signal which is recorded at instant t=3 s (portion C of FIG. 3). The signal recorded at time t=0.5 s is compared with the signal recorded at time t=3.5 s, and so on.

The next stage consists in mutually comparing a variable number of results in order to eiminate spurious results which may be due to a person passing quickly in front of the television set, to the temporary superposition of the images of two people, etc. . . . . . This stage is represented by portion D of FIG. 3 for the case where three successive results are mutually compared. The result of this comparison is recorded at instant t=4 s.

It follows from the timing of these various stages, that the final result is obtained 4 s after the first event to be recorded. This delay is known since it is determined by the frequency at which the photodetectors are read, the frequency at which the read and digitized signals are recorded, the selected time interval between the pairs of signals which are compared, and the number of successive results which are mutually compared, and it can therefore be taken into account by the microprocessor which specifies the exact instant corresponding to each result.

The microprocessor also serves to adjust the frequency at which the digitized signals are recorded at the time interval between two compared signals as a function of the detected speed of displacement of a person in the scene being observed. Naturally, when people are sitting down in front of a television set, their movements are generally relatively slow, and the time interval between two recorded signals that are to be compared should be at least 2 s to 3 s in order to ensure that the difference between the two compared signals is not substantially zero, i.e. so as to make it possible to determine the number of people present. However, when people are moving rapidly in a premises, this time interval between compared signals should be smaller and the frequency at which signals are recorded may be increased.

The method of the invention is performed by the microcomputer under the control of software comprising a set of programs whose main functions are as follows:

acquire the signals provided by the photodetectors of the strip;

compare these signals in pairs in order to determine a difference at each point, compare the difference with a threshold as a function of the energy level from the photodetector under consideration (e.g. compare a given signal with the signal that preceded it by 0.1 s, by 1 s, by 2 s, by 3 s, and by 4 s), and obtain result signals;

compare successive result signals with each other to verify continuity and to determine an overall result over a given period, e.g. over 1 second;

compare the results obtained in this way over various periods, e.g. 3 s, 5 s, 10 s, or 15 s or more, said periods varying as a function of the results obtained (probabilities of the corresponding data), and make conclusions about the movements of people entering and leaving the field of observation of the strip of photodetectors and about the number of people present; and present and display the results.

Appendices A, B, and C are the main parts of the programs and correspond respectively acquiring the signals, to determining the amplification gain, and to displaying the results (with the other programs being essentially constituted by signal comparisons which can easily be written by the person skilled in the art).

ANNEXE A APPENDIX A

```
PROCEDURE      PIA_Ecriture_gain( Gain : BYTE);EXTERN;

FUNCTION       PIA_Lecture_Registre(Adreg : WORD):BYTE;EXTERN;

(*-----------------------------------------------------------------------*)
(*  1a: ACQUISITION D'UNE IMAGE VIDEO   ACQUIRING A VIDEO IMAGE          *)
(*-----------------------------------------------------------------------*)

PROCEDURE ACQ_Image;

VAR  Val      : UTIL_NIVEAU_DE_GRIS;
     Registre : ADS OF WORD;

BEGIN
   Registre.S := BaseReg;
   Registre.R := 0;
   MOVESL(Registre,ADS Val,1);
   Val := #CF AND Val;
   Val := #20 OR Val;
   MOVESL(ADS Val,Registre,1);  (* Acquisition d'une image en RAM video *)
                                (Acquiring an image in video RAM)
END;
```

```
(*-----------------------------------------------------------------*)
(*  2 : ACQUISITION D'UNE LIGNE VIDEO  ACQUIRING A VIDEO LINE     *)
(*-----------------------------------------------------------------*)
PROCEDURE ACQ_ligne (Numero_Ligne : UTIL_ETENDUE_COLONNE;
                    VAR Ligne : UTIL_Ligne_video);

BEGIN
   Adresse.S := seg64K;
   WHILE (Done_Flag AND #30)<> 0  DO; (* attente acquisition *)
   BlockSelect := 2*(Numero_Ligne DIV 256) ;
   Adresse.R := WRD(256*(Numero_Ligne MOD 256)) ;
   MOVESL(Adresse,ADS Ligne,256);
   BlockSelect := 2*(Numero_Ligne DIV 256) + 1 ;
   Adresse.R := WRD(256*(Numero_Ligne MOD 256)) ;
   MOVESL(Adresse,ADS Ligne[256],256);
END;

(*-----------------------------------------------------------------*)
(* INITIALISATION DU PIA  PIA INITIALIZATION                      *)
(*-----------------------------------------------------------------*)
  PROCEDURE ACQ_Init_Capteur(Gain_capteur : BYTE);

BEGIN
    PIA_init;
    PIA_attente_vidage;
    PIA_attente_vidage;
    PIA_Ecriture_gain(Gain_capteur);
  END;

(*-----------------------------------------------------------------*)
(* LECTURE D'UNE LIGNE SUR LE CAPTEUR                             *)
(*   READING A LINE ON THE DETECTORS                              *)
(*-----------------------------------------------------------------*)
PROCEDURE ACQ_ligne_Capteur(VAR Ligne_video : UTIL_ligne_video);
BEGIN
   PIA_attente_vidage;
   PIA_Lecture_ligne(Ligne_video);
END;
FUNCTION ACQ_Energie:BYTE;
BEGIN
  ACQ_Energie := PIA_lecture_energie;
END;
(*-----------------------------------------------------------------*)
```

END.

(*---------------------- Fin de Acquis.pas ----------------------*)
                       END OF ACQUIS.PAS
ANNEXE B APPENDIX B

MODULE GAIN_AUTO; AUTO GAIN MODULE (*$ Include :'\CAIN\UTILS\POSUTI.i' *)

VAR
        MAI_Ligne_video : UTIL_ligne_video;
        Ancien_Gain : BYTE;
        Nouveau_Gain : BYTE;
        Energie : BYTE;
        Fin,Gain_modifie : BOOLEAN;
        Clavier : BYTE;

PROCEDURE UTIL_effacer_ecran;EXTERN;
FUNCTION DOSXQQ(a,b: WORD):BYTE;EXTERN;
(*-------------------------------------------------------------------*)
(* Procedures et fonctions importees du module PIA_util.asm          *)
(* Proceedings and functions from PIA util.asm module                *)
(*-------------------------------------------------------------------*)
PROCEDURE       PIA_Init;EXTERN;
PROCEDURE       PIA_Attente_vidage;EXTERN;
PROCEDURE       PIA_Lecture_Ligne (VAR Ligne_video:UTIL_Ligne_Video);EXTERN;
FUNCTION        PIA_Lecture_energie : BYTE;EXTERN;
PROCEDURE       PIA_Ecriture_gain( Gain : BYTE);EXTERN;
FUNCTION        PIA_Lecture_Registre(Adreg : WORD):BYTE;EXTERN;

(*-------------------------------------------------------------------*)
(* Procedures et fonctions LOCALES                                   *)
(* Local proceedings and functions                                   *)
(*-------------------------------------------------------------------*)

FUNCTION PIA_GAIN_AUTOMATIQUE(Energie,Ancien_Gain : BYTE;
                              VAR Nouveau_Gain : BYTE): BOOLEAN;

CONST
   Consigne_Energie_Reelle = 50.0;
   Consigne_Energie_Entiere= 50;

Ecart_Energie = 12;
   Ecart_Energie_reelle = 12.0;
   Gain_Maximum = 130;
VAR frac,New_real_gain : REAL;

BEGIN
   IF (ABS( ORD(Energie) - Consigne_Energie_Entiere )) > Ecart_Energie THEN
     PIA_Gain_automatique := TRUE
   ELSE
     PIA_Gain_Automatique:= FALSE;

IF (Energie = 0) THEN Nouveau_Gain := Gain_Maximum
   ELSE
   BEGIN
     Frac := ORD(Ancien_gain)/ORD(Energie);
     New_Real_gain := Frac*Consigne_Energie_Reelle;
     IF New_real_gain >255 THEN Nouveau_gain := 255
     ELSE Nouveau_Gain := LOBYTE(ROUND(New_real_gain));
     IF Nouveau_gain = 0 THEN Nouveau_gain := 1;
     IF ABS(ORD(Nouveau_gain)/Frac - Consigne_energie_reelle)
           > Ecart_energie_reelle  THEN
       Nouveau_gain := Ancien_Gain;
```

```
    END;
    IF Nouveau_gain=Ancien_gain THEN PIA_Gain_Automatique := FALSE;
  END;
```

```
(*-------------------------------------------------------------------*)
(* PROGRAMME PRINCIPAL                                              *)
(* MAIN PROGRAM                                                     *)
(*-------------------------------------------------------------------*)
PROCEDURE PIA_AJUST_Gain(VAR gain:BYTE);

VAR   I : INTEGER;
BEGIN
   Ancien_Gain:= Gain;
   Fin := FALSE;
   Gain_Modifie := FALSE;
   I := 0;
   REPEAT
     PIA_Attente_Vidage;
     PIA_Attente_Vidage;
     Energie := PIA_Lecture_Energie;
     Gain_Modifie := PIA_Gain_Automatique(Energie,Ancien_Gain,Nouveau_Gain);
     IF NOT Gain_modifie THEN I := I+1  ELSE  I:= 0;
     UTIL_Effacer_ecran;
     WRITELN('Nouveau Gain = ',Nouveau_Gain:3,'   Ancien Gain =',Ancien_Gain:3);
     WRITELN('Gain modifie =',Gain_Modifie,'   Energie vaut = ',Energie:3);
     PIA_ecriture_gain(Nouveau_gain);
     Ancien_Gain := Nouveau_Gain;
     PIA_Lecture_Ligne(MAI_Ligne_video);
     Clavier := DOSXQQ(6,255);
     IF ORD(Clavier) IN [ORD('s'),ORD('S')] THEN Fin := TRUE;
   UNTIL (Fin OR ( I>=10));
   gain:=Nouveau_gain;
END;
end.
```

ANNEXE C  APPENDIX C

Module Peinture ; painting module

```
(*$ INCLUDE : '\CAIN\COUCHE_4\PARAM\Typroba.inc'  *)

(*$ INCLUDE : '\CAIN\AUDIMAT\TypChain.inc'  *)

(*$ INCLUDE : '\CAIN\COUCHE_6\TypeC6.inc'  *)
```

```
(*-------------------------------------------------------------------*)
(* Procedures et fonctions importees du systeme                     *)
(* Proceedings and functions from the system                        *)
(*-------------------------------------------------------------------*)
PROCEDURE TIME(VAR Str : STRING);EXTERN;
(*-------------------------------------------------------------------*)
(* Procedures et fonctions importees du module UTASM.ASM            *)
(* Proceedings and functions from the UTASM.ASM module              *)
(*-------------------------------------------------------------------*)

PROCEDURE    UTAS_Position_curseur(Colonne,ligne:INTEGER);EXTERN;

FUNCTION     UTAS_Horloge:INTEGER;EXTERN;

PROCEDURE    UTAS_Ecriture_LSTRING_CRT(CONST Message : LSTRING);EXTERN;

PROCEDURE    UTAS_ECRIRE_lstring_en(ligne,colonne:INTEGER;
                              CONST message:LSTRING);EXTERN;
```

```
PROCEDURE    UTAS_Cursor_off;EXTERN;
(*------------------------------------------------------------------------*)
(* Procedures et fonctions locales au module  COUCHE_6.pas              *)
(* Local proceedings and functions in COUCHE 6-pas module               *)
(*------------------------------------------------------------------------*)
(*---------------- HOME ----------------------------------*)

PROCEDURE C6_Home;
 BEGIN
    WRITE(Esc_cro,'2J',CHR(17));
 END;

(*------------------- ECRIRE_HEURE -------------------------*) WRITE HOUR

PROCEDURE C6_Ecrire_Heure;
 (*$ include : 'CHIFFRE.INC'*)
 VAR Heure : STRING(8);
     I,J,debut : INTEGER;
 VAR [STATIC] Heure_aff : STRING(8);

BEGIN
   TIME(Heure);
   J:=20;
   i:=1;
   Debut := 9;
   WHILE ( i < 9) DO
   BEGIN
   IF (Heure_aff[i] = Heure[i]) THEN
   BEGIN
      IF (I MOD 3 = 0) THEN J := J+2 ELSE J:=J+4;
      I := I + 1;
   END
   ELSE
   BEGIN
     Debut := i;
     I:= 9;
   END;
   END;
   IF Debut < 9 THEN
   BEGIN
      FOR I:=DEbut TO 8 DO
      BEGIN
        Heure_aff[i] := Heure[i];
        IF J <10 THEN WRITE(Esc_cro,'20;',J:1,'H')
        ELSE          WRITE(Esc_cro,'20;',J:2,'H');

CASE Heure[I] OF
          '0':WRITE(Fond_Noir,Car_Jaune,Chiffre_0,N_et_B);
          '1':WRITE(Fond_Noir,Car_Jaune,Chiffre_1,N_et_B);
          '2':WRITE(Fond_Noir,Car_Jaune,Chiffre_2,N_et_B);
          '3':WRITE(Fond_Noir,Car_Jaune,Chiffre_3,N_et_B);
          '4':WRITE(Fond_Noir,Car_Jaune,Chiffre_4,N_et_B);
          '5':WRITE(Fond_Noir,Car_Jaune,Chiffre_5,N_et_B);
          '6':WRITE(Fond_Noir,Car_Jaune,Chiffre_6,N_et_B);
          '7':WRITE(Fond_Noir,Car_Jaune,Chiffre_7,N_et_B);
          '8':WRITE(Fond_Noir,Car_Jaune,Chiffre_8,N_et_B);
          '9':WRITE(Fond_Noir,Car_Jaune,Chiffre_9,N_et_B);
          ':':WRITE(Fond_Noir,Car_Jaune,Deux_pts,N_et_B);
        OTHERWISE;
        END;
        IF (I MOD 3 = 0) THEN J := J+2 ELSE J:=J+4;
     END;
   END;
 END;
(*---------------- Dessine Ecran ---------------------*)DRAW SCREEN
```

```
PROCEDURE C6_Dessine_Ecran;

CONST Line_of_line5 = Type_ligne_75
        (DO 11 OF CHR(196),CHR(197),DO 11 OF CHR(196),CHR(197),
         DO 11 OF CHR(196),CHR(197),DO 11 OF CHR(196),CHR(197),
         DO 11 OF CHR(196),CHR(197),DO 11 OF CHR(196),CHR(197),
         CHR(196),CHR(16),CHR(196));
      Line_of_line30 = Type_ligne_75
        (DO  9 OF CHR(196),CHR(197),DO  9 OF CHR(196),CHR(197),
         DO  9 OF CHR(196),CHR(197),DO  9 OF CHR(196),CHR(197),
         DO  9 OF CHR(196),CHR(197),DO  9 OF CHR(196),CHR(197),
         DO  9 OF CHR(196),CHR(197),DO  3 OF CHR(196),CHR(16),CHR(196));
      Line_of_Grise = Type_Ligne_75
        (DO  75 OF CHR(176));

BEGIN
  WRITE(Esc_cro,'1;20H Doute  ');
  WRITE(Esc_cro,'2;1H ',Fond_Noir,Car_Rouge,CHR(30),N_et_B,
        esc_cro,'2;78H',Fond_Noir,Car_Rouge,CHR(30),N_et_B,' ');
  WRITE(Esc_cro,'3;1H ',Fond_Noir,Car_Rouge,CHR(179),N_et_B,
        esc_cro,'3;78H',Fond_Noir,Car_Rouge,CHR(179),N_et_B,' ');
  WRITE(Esc_cro,'4;1H6',Fond_Noir,Car_Rouge,CHR(179),N_et_B,
        esc_cro,'4;78H',Fond_Noir,Car_Rouge,CHR(179),N_et_B,'6');
  WRITE(Esc_cro,'5;1H5',Fond_Noir,Car_Rouge,CHR(179),N_et_B,
        esc_cro,'5;78H',Fond_Noir,Car_Rouge,CHR(179),N_et_B,'5');
  WRITE(Esc_cro,'6;1H4',Fond_Noir,Car_Rouge,CHR(179),N_et_B,
        esc_cro,'6;78H',Fond_Noir,Car_Rouge,CHR(179),N_et_B,'4');
  WRITE(Esc_cro,'7;1H3',Fond_Noir,Car_Rouge,CHR(179),N_et_B,
        esc_cro,'7;78H',Fond_Noir,Car_Rouge,CHR(179),N_et_B,'3');
  WRITE(Esc_cro,'8;1H2',Fond_Noir,Car_Rouge,CHR(179),N_et_B,
        esc_cro,'8;78H',Fond_Noir,Car_Rouge,CHR(179),N_et_B,'2');
  WRITE(Esc_cro,'9;1H1',Fond_Noir,Car_Rouge,CHR(179),N_et_B,
        esc_cro,'9;78H',Fond_Noir,Car_Rouge,CHR(179),N_et_B,'1');

WRITE(Esc_cro,'10;1H ',Fond_Noir,Car_Rouge,CHR(192),Line_of_line5,CHR(217),
        N_et_B,' ');

WRITE(Esc_cro,'11;20HAudience instantanee     Ech: > 12 sec   <');

(* dessin de la TV *)

UTAS_Cursor_off;

WRITE(Esc_cro,'16;25HCHAINE  :');

WRITE(Esc_cro,'15;38H',Fond_Noir,Car_Blanc,
                         chr(220),chr(220),chr(220),chr(220),chr(220),n_et_b);
  WRITE(Esc_cro,'16;38H',Fond_NOir,Car_Blanc,
                         CHR(219),CHR(32),CHR(32),CHR(32),CHR(219),N_et_B);
  WRITE(Esc_cro,'17;38H',Fond_Noir,Car_Blanc,
                         chr(223),chr(223),chr(223),chr(223),chr(223),n_et_b);

(* Suppression du curseur *) cancel cursor

UTAS_Cursor_off;

END;

PROCEDURE C6_Ecrire_CHaine(Chaine:INTEGER);

BEGIN
    CASE Chaine OF
      0,254,255: WRITE(Esc_cro,'16;40H',Fond_Noir,Car_Rouge,CHR(32),N_et_B);

1 : WRITE(Esc_cro,'16;40H',Fond_Noir,Car_Rouge,'1',N_et_B);

2 : WRITE(Esc_cro,'16;40H',Fond_Noir,Car_Rouge,'2',N_et_B);
```

```
3 :    WRITE(Esc_cro,'16;40H',Fond_Noir,Car_Rouge,'3',N_et_B);

4 :    WRITE(Esc_cro,'16;40H',Fond_Noir,Car_Rouge,'4',N_et_B);

5 :    WRITE(Esc_cro,'16;40H',Fond_Noir,Car_Rouge,'5',N_et_B);

6 :    WRITE(Esc_cro,'16;40H',Fond_Noir,Car_Rouge,'6',N_et_B);

7 :    WRITE(Esc_cro,'16;40H',Fond_Noir,Car_Rouge,'7',N_et_B);

OTHERWISE;
   END;

END;

END.
```

We claim:

1. A method of determining the number of people present in a determined space, the method being characterized in that it consists in forming an image of said space on a strip or set (14) of photodetectors (16), in reading the gray levels of the points in said image at a determined read frequency, in comparing the gray levels of the same points in successive images, in determining the variations in gray levels which are caused by the movements of a person, and in deducing the number of people present in said space therefrom.

2. A method according to claim 1, characterized in that it consists in varying the frequency at which the photodetectors (16) are read as a function of the intensity with which the space is illuminated in order to obtain a mean image gray level which is substantially independent of lighting conditions.

3. A method according to claim 1, characterized in that it consists in recording the above-specified images at a frequency which is a submultiple of the read frequency, in comparing pairs of successive images which are separated from each other by a determined number of recorded images, and in determining the variations in gray levels by taking the difference between these signals.

4. A method according to claim 3, characterized in that it consists in varying the frequency at which images are recorded and/or the number of images separating two compared images as a function of the speed of displacement of a person.

5. A method according to claim 3, characterized in that it consists in transforming the variations in the gray levels into binary signals, by rectification and comparison with a threshold determined as a function of the illumination of each point under consideration.

6. A method according to claim 5, characterized in that it then consists in filtering the binary signals in order to eliminate signals which are too small to correspond to a person.

7. A method according to claim 3, characterized in that it consists in mutually comparing a variable number of successive results in order to eliminate erroneous results due, for example, to a local variation in illumination or to the temporary superposition of the images of two people.

8. A method according to claim 1, characterized in that it is applied to determining the number of people watching a television set, or to performing surveillance of premises.

9. A device for determining the number of people present in a determined space, characterized in that it comprises an objective lens (10) forming an image of said space on a strip or set (14) or photodetectors (16), circuits (18) for controlling and reading the photodetectors, an analog-to-digital converter (20), and information processing means (22), such as a microprocessor, for comparing the signals successively provided by the photodetectors in order to determine significant differences in said signals due to a person moving, and for deducing the number of persons present in the field of observation of the lens (10) therefrom.

10. A device according to claim 9, characterized in that it comprises means for determining the frequency with which the photodetectors (16) are read as a function of the intensity of illumination in said space.

11. A device according to claim 9, characterized in that it comprises means for recording the signals as read and digitized, said recording taking place at a frequency which is a submultiple of the photodetector read frequency, and means for comparing and taking the difference between pairs of successively recorded signals which are separated from each other by a determined number of recorded signals.

12. A device according to claim 11, characterized in that it comprises means for transforming the differences between the compared signals into bimary signals, and filter circuits for eliminating non-significant differences.

13. A device according to claim 9, characterized in that it comprises means for comparing a variable number of successively obtained results, and for eliminating spurious results.

14. A device according to claim 9, characterized in that it is associated with a system for performing surveillance of premises, or with a television set for the purpose of determining the number of people watching the set.

* * * * *

UNITED STATES PATENT AND TRADEMARK OFFICE
CERTIFICATE OF CORRECTION

PATENT NO. : 4,922,093

DATED : May 1, 1990

INVENTOR(S) : Michel Fardeau, et al.

It is certified that error appears in the above-identified patent and that said Letters Patent is hereby corrected as shown below:

Column 2, line 38, "photodetector" should be
  -- photodetectors --.

Column 2, lines 53 and 54 "bimary" should be
  -- binary --.

Column 2, line 61, "chracteristics" should be
  -- characteristics --.

Column 4, line 17, "to" (first occurrence) should be
  -- too --.

Column 4, line 49, "signls" should be -- signals --.

Column 4, line 66, "eiminate" should be -- eliminate --.

Column 5, line 17, "at" (second occurrence) should be
  -- and --.

Column 18, line 26, "or" (second occurrence) should be
  -- of --.

UNITED STATES PATENT AND TRADEMARK OFFICE
CERTIFICATE OF CORRECTION

PATENT NO. : 4,922,093

DATED : May 1, 1990

INVENTOR(S) : Michel Fardeau, et al.

It is certified that error appears in the above-identified patent and that said Letters Patent is hereby corrected as shown below:

Column 18, line 50, "bimary" should be -- binary --.

Signed and Sealed this

Fourth Day of February, 1992

*Attest:*

HARRY F. MANBECK, JR.

*Attesting Officer*      *Commissioner of Patents and Trademarks*